US006792425B2

(12) United States Patent
Yagawa et al.

(10) Patent No.: US 6,792,425 B2
(45) Date of Patent: Sep. 14, 2004

(54) SECURE MULTI DATABASE SYSTEM INCLUDING A CLIENT, MULTI DATABASE SERVER, AND DATABASE SERVER

(75) Inventors: Yuichi Yagawa, Tokyo (JP); Mitsuhiko Yoshimura, Tokyo (JP); Akira Maeda, Tokyo (JP); Shigetoshi Hayashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 273 days.

(21) Appl. No.: 09/853,348

(22) Filed: May 11, 2001

(65) Prior Publication Data

US 2002/0065956 A1 May 30, 2002

(30) Foreign Application Priority Data

Nov. 30, 2000 (JP) ........................................ 2000-369606

(51) Int. Cl.[7] .............................................. G06F 17/30
(52) U.S. Cl. ................................ 707/10; 707/2; 707/3; 707/101; 713/151; 713/153; 705/64; 705/70
(58) Field of Search ................................ 707/2, 3, 4, 5, 707/8, 10, 101; 713/150, 151, 153, 162; 705/64, 70, 78, 42

(56) References Cited

U.S. PATENT DOCUMENTS

| 5,713,018 | A | | 1/1998 | Chan |
| 5,903,652 | A | * | 5/1999 | Mital ........................... 705/78 |
| 5,963,642 | A | | 10/1999 | Goldstein |
| 6,199,077 | B1 | * | 3/2001 | Inala et al. ............... 715/501.1 |
| 6,209,095 | B1 | * | 3/2001 | Anderson et al. ........... 713/176 |
| 6,477,565 | B1 | * | 11/2002 | Daswani et al. ............ 709/217 |
| 6,499,036 | B1 | * | 12/2002 | Gurevich ................. 707/103 R |
| 2002/0078079 | A1 | * | 6/2002 | Rangan et al. .............. 707/500 |
| 2002/0095651 | A1 | * | 7/2002 | Kumar et al. ................ 717/104 |
| 2002/0138431 | A1 | * | 9/2002 | Antonin et al. ............... 705/42 |

OTHER PUBLICATIONS

Yap et al., "Agent Managed Multi Database System Design for the Stock Broking Domain", Proceedings of the 11th Internation Workshop on Database and Expert system applications, Sep., 2000, pp. 471–476.*

Eisenberg, Andrew; and Melton, Jim, "SQL:1999, formerly known as SQL3", SIGMOD Record, vol. 28, No. 1, Mar., 1999, pp. 131–138.

Eisenberg, Andrew; and Melton, Jim, "SQL Standarization: The Next Steps", SIGMOD Record, vol. 29, No. 1, Mar., 2000, pp. 62–67.

Muralidhar, Krishnamurty; and Sarathy, Rathindra, "Security of Random Data Perturbation Methods", ACM Transactions on Database Systems, vol. 24, No. 4, Dec. 1999, pp. 487–493.

Papiani, Mark; Wason, Jasmin L.; Dunlop, Alistair N.; and Nicole, Denis A., "A Distributed Scientific Data Archive Using the Web, XML and SQL/MED", SIGMOD Record, vol. 28, No. 3, Sep. 1999, pp. 56–63.

Yodlee.com, Inc., "the power behind aggregation", http://www.Yodlee.com/, © 1999–2000, p. 1.

* cited by examiner

Primary Examiner—Srirama Channavajjala
Assistant Examiner—Khanh Pham
(74) Attorney, Agent, or Firm—Townsend and Townsend and Crew LLP

(57) ABSTRACT

A definition tool of the present invention declares columns which are concealed in external tables to a multi-database server. The multi-database server controls a decomposition and an execution of query messages such that the multi-database server does not perform an arithmetic using the concealed columns. The external database server encrypts the data of concealed columns in tables of query result tables. The multi-database server designates a range to be decrypted at the time of acquiring and integrating respective result tables. A client program acquires an integrated result table and decrypts the designated range. Since the data encrypted by the external database server is decrypted by and is referred to the client program, it becomes difficult for the multi-database server to refer to a content of the concealed columns.

13 Claims, 16 Drawing Sheets

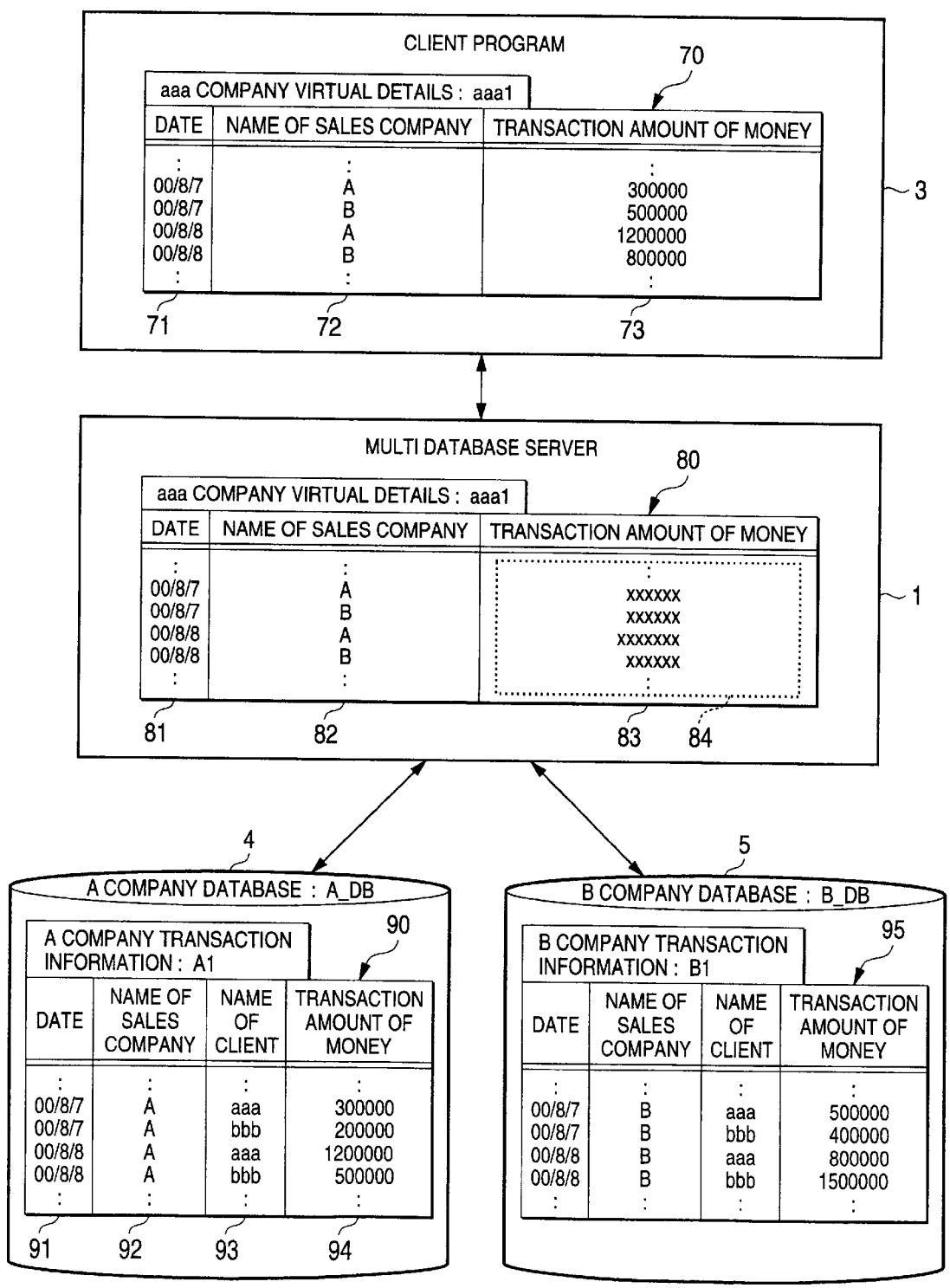

FIG. 4

```
CREATE FOREIGN TABLE A1
    (DATE                              DATE,
     NAME OF SALES COMPANY             CHAR (50),
     NAME OF CLIENT                    CHAR (50),
     TRANSACTION AMOUNT OF MONEY       CHAR (15),
     ENCRYPTED (TRANSACTION AMOUNT OF MONEY))     ~21
    SERVER A_DB

CREATE FOREIGN TABLE B1
    (DATE                              DATE,
     NAME OF SALES COMPANY             CHAR (50),
     NAME OF CLIENT                    CHAR (50),
     TRANSACTION AMOUNT OF MONEY       CHAR (15),
     ENCRYPTED (TRANSACTION AMOUNT OF MONEY))     ~21
    SERVER B_DB
```

FIG. 5

```
CREATE VIEW a1  (DATE, NAME OF SALES COMPANY,
                 TRANSACTION AMOUNT OF MONEY)

AS     SELECT   A1. DATE, A1. NAME OF SALES COMPANY,
                     A1. TRANSACTION AMOUNT OF MONEY
            FROM     A1
            WHERE    A1. NAME OF CLIENT = 'aaa'

UNION  SELECT   B1. DATE, B1. NAME OF SALES COMPANY,
                     B1. TRANSACTION AMOUNT OF MONEY
            FROM     B1
            WHERE    B1. NAME OF CLIENT = 'aaa'
```

FIG. 8

EXTERNAL TABLE DEFINITION INFORMATION 17

| DB NAME | TABLE NAME | COLUMN NAME | DATA TYPE | DATA LENGTH | ACCURACY | NULLABLE | ENCRYPTED |
|---------|------------|-------------|-----------|-------------|----------|----------|-----------|
| ..... | ..... | ..... | ..... | ..... | ..... | ..... | ..... |
| A_DB | A1 | DATE | DATE | — | — | YES | NO |
| A_DB | A1 | NAME OF SALES COMPANY | CHAR | 50 | — | YES | NO |
| A_DB | A1 | NAME OF CLIENT | CHAR | 50 | — | YES | NO |
| A_DB | A1 | TRANSACTION AMOUT OF MONEY | CHAR | 15 | — | YES | YES |
| ..... | ..... | ..... | ..... | ..... | ..... | ..... | ..... |
| B_DB | B1 | DATE | DATE | — | — | YES | NO |
| B_DB | B1 | NAME OF SALES COMPANY | CHAR | 50 | — | YES | NO |
| B_DB | B1 | NAME OF CLIENT | CHAR | 50 | — | YES | NO |
| B_DB | B1 | TRANSACTION AMOUT OF MONEY | CHAR | 15 | — | YES | YES |
| ..... | ..... | ..... | ..... | ..... | ..... | ..... | ..... |
| 131 | 132 | 133 | 134 | 135 | 136 | 137 | 138 |

SECURE MULTI DATABASE SYSTEM INCLUDING A CLIENT, MULTI DATABASE SERVER, AND DATABASE SERVER

BACKGROUND OF THE INVENTION

1. Field of the Invention

The present invention relates to a multi-database system where databases are present in a distributed form. Among others, the present invention relates to security for the disclosure of information of the multi-database system. The present invention, more particularly, relates to a secure multi-database system in which a plurality of databases are operated in an federating manner and security for individual databases is ensured, and an information mediation system on a network to which such a system is applied.

2. Description of the Related Art

Currently, as a technique for getting access to a multi-database (MDB) system, there has been known a technique which gets access to a table (an external table) of an external database (external DB) through an external data wrapper. In this technique, a user declares an access method to the external DB or the configuration of the external table to the MDB system. In the MDB system, the external table is handled in the same manner as a usual view table and it is possible for the user to declare a view table which combines external tables together or a view table which combines the external table with a table inside the MDB system (an internal table).

ISO/IEC standardizes the architecture and a database language of this MDB system as "Database Language SQL-Part 9: Management of External Data (SQL/MED)" which is a database language SQL having a specification Part 9 for a next generation known as SQL3 or SQL-Part 99. With respect to SQL/MED, a draft of ISO/IEC is laid open to the public and as an article which interprets ISO/IEC, ACM SIGMOD Record, Vol.29, No.1, March 2000, pp63–67, "SQL Standardization: The Next Steps" is available.

Conventionally, as security for DB, a method which sets an access authority to the data to individual users and controls access to the DB based on such access authority "access control" has been dominantly used. The same goes for the MDB.

Recently, along with the popularization of the Internet, the Intranet and the Extranet, the chances that the user gets access to the DB through the network have been increased. In this case, to protect the query messages and data being transmitted through the network from improper access, there has been proposed a method which transmits the query messages and data after encrypting the query messages and data. As a method for encrypting the query messages, U.S. Pat. No. 5,713,018 discloses "SYSTEM AND METHOD FOR PROVIDING SAFE SQL-LEVEL ACCESS TO A DATABASE". Further, as a method for processing data by encrypting the data on a DBMS, U.S. Pat. No. 5,963,642 discloses "METHOD AND APPARATUS FOR SECURE STORAGE OF DATA".

Further, as an example which adopts a multi-database system as an information mediation business on the Internet, "Yodlee.com" is known. This business is a service which provides the service details which individual service providers provide in a form that the service details are integrated into one. The user can get the reference of all of the service details by merely getting access to Yodlee.com and hence, it is unnecessary for the user to get access to individual service providers. Yodlee.com regards individual service providers as information sources and performs inquiries of the service details to the service providers while setting respective users as keys and integrates and provides the results of inquiries to the users. Here, although the acquired service details are cached in an internal DB, security is ensured by encrypting the data of this internal DB.

SUMMARY

First of all, problems on techniques to realize the information mediation business on a network which are analyzed by inventors of the present invention are explained in conjunction with FIG. 17. Then, taking this business as an example, tasks to be solved by the present invention are specifically explained.

The information mediation business is a service business which virtually integrates information sources distributed on the network and provides an integrated access path to users. When viewed from the stand point of users, since destinations to which inquiries are made are integrated into one, the availability is increased. The previously mentioned Yodlee.com is also a kind of information mediation business and intermediates enterprises and personal users. This mode is a so-called "B2C type". Besides this B2C type, there exists a mode of B2B type which intermediates enterprises and enterprise users and FIG. 17 shows such an example.

In FIG. 17, a mediator 301 provides an access path for an A sales company 304a, a B sales company 304b and a C sales company 304c to an aaa company 303a, a bbb company 303b and a ccc company 303c which constitute client enterprises as virtual detailed statement slips 302a-302c. The substance of the virtual detailed statement slips is a view table and respectively declares transaction information 45a, 45b and 45c as external tables in a multi-database server 1 and merges them using respective client enterprises as keys. Inquiries from clients 3a, 3b and 3c are transmitted to respective DB 45a-45c through the multi-database server 1 and tables on query results (result tables) are integrated and returned to respective clients. In this specification, "declaration" or "to declare" means "to designate".

With respect to this business, in the multi-database server 1, a system to ensure the security for virtual detailed statement slips of clients becomes far more important than a conventional case. This is because that to consider the business from a viewpoint of security, although the transaction information is distributed to the database of respective sales companies so that the risk brought about by improper access becomes inevitably distributed, since the transaction information are merged through virtual detailed statement slips so that damages when the improper access happens are increased. Particularly, if it is possible to provide a system in which even if the mediator 301 is an administrator of the multi-database server 1, he cannot observe the contents of the mediation information so that the reliability of the mediator from not only the users but also the information provider side can be increased.

Subsequently, tasks of conventional techniques to satisfy this requisite are explained.

First of all, in an access control, although an unauthorized user is prevented from getting access to the virtual detailed statement slips, the administrator can easily get access to the virtual detailed statement slips and hence, the above-mentioned requisite cannot be satisfied. Eventually, it is difficult for the mediator to acquire the reliability from the users and the information providers so that it is difficult to establish the information mediation business.

Although the method which encrypts query messages and result tables which are transmitted through the network can prevent these information from being improperly stolen or forged, the method is only applicable to a case where a client and a database correspond to each other on a one to one basis. That is, there has been a problem that it is difficult to directly apply this method to a multi-database.

Although the previously mentioned Yodlee.com method encrypts data to be stored in an inner DB so that it provides a system in which even an administrator can not easily refer to data of the inner DB, the administrator can refer to data before the data is encrypted in a multi-database server in principle so that it is difficult to completely satisfy the above-mentioned requisite. Further, a man who sets and executes the encryption is the administrator himself so that it is difficult for users and information providers to totally rely on the mediator.

Accordingly, it is a first object of the present invention to provide a secure multi-database system in which it is difficult even for an administrator to observe contents of data transacted between clients and external database.

Further, it is a second object of the present invention to provide a information mediation system in which it is difficult even for an administrator to observe contents of information transacted between users and information providers.

To achieve the above-mentioned objects, the present invention adopts following configurations.

In a multi-database system of the present invention, a plurality of database apparatuses which respectively store data, a multi-database processing apparatus which performs an integration processing of data stored in a plurality of the above-mentioned database apparatuses and user processing apparatuses which receive data subjected to the integration processing from the multi-database processing apparatus are constituted such that they are connected each other through a network.

Among the distributed data which are necessary for the above-mentioned multi-database processing apparatus to perform the integration processing, a plurality of database apparatuses respectively perform the conversion processing based on a predetermined rule with respect to partial data in a give data region contained in the distributed data and transmit the distributed data containing the partial data which are subjected to the conversion processing to the above-mentioned multi-database processing apparatus.

Further, the above-mentioned multi-database processing apparatus receives a plurality of the distributed data containing the partial data which are subjected to the conversion processing from a plurality of database devices, and generates the integral data by integrating a plurality of received distributed data, and transmits the integrated data to the user apparatuses.

In the above-mentioned conversion processing, it may be possible to perform the conversion such that the converted partial data is not disclosed. For example, the conversion processing includes the application of encrypting processing.

BRIEF DESCRIPTION OF THE DRAWINGS

FIG. 3 is an explanatory view showing a use example of secure multi-database system according to one embodiment of the present invention.

FIG. 4 is an explanatory view showing an example of definition messages of an external table in a secure multi-database system according to one embodiment of the present invention.

FIG. 5 is an explanatory view showing an example of definition messages of a view table in a secure multi-database system according to one embodiment of the present invention.

FIG. 8 is an explanatory view showing an external table definition information in a secure multi-database system according to one embodiment of the present invention employing a use example.

DETAILED DESCRIPTION

Figure 1:
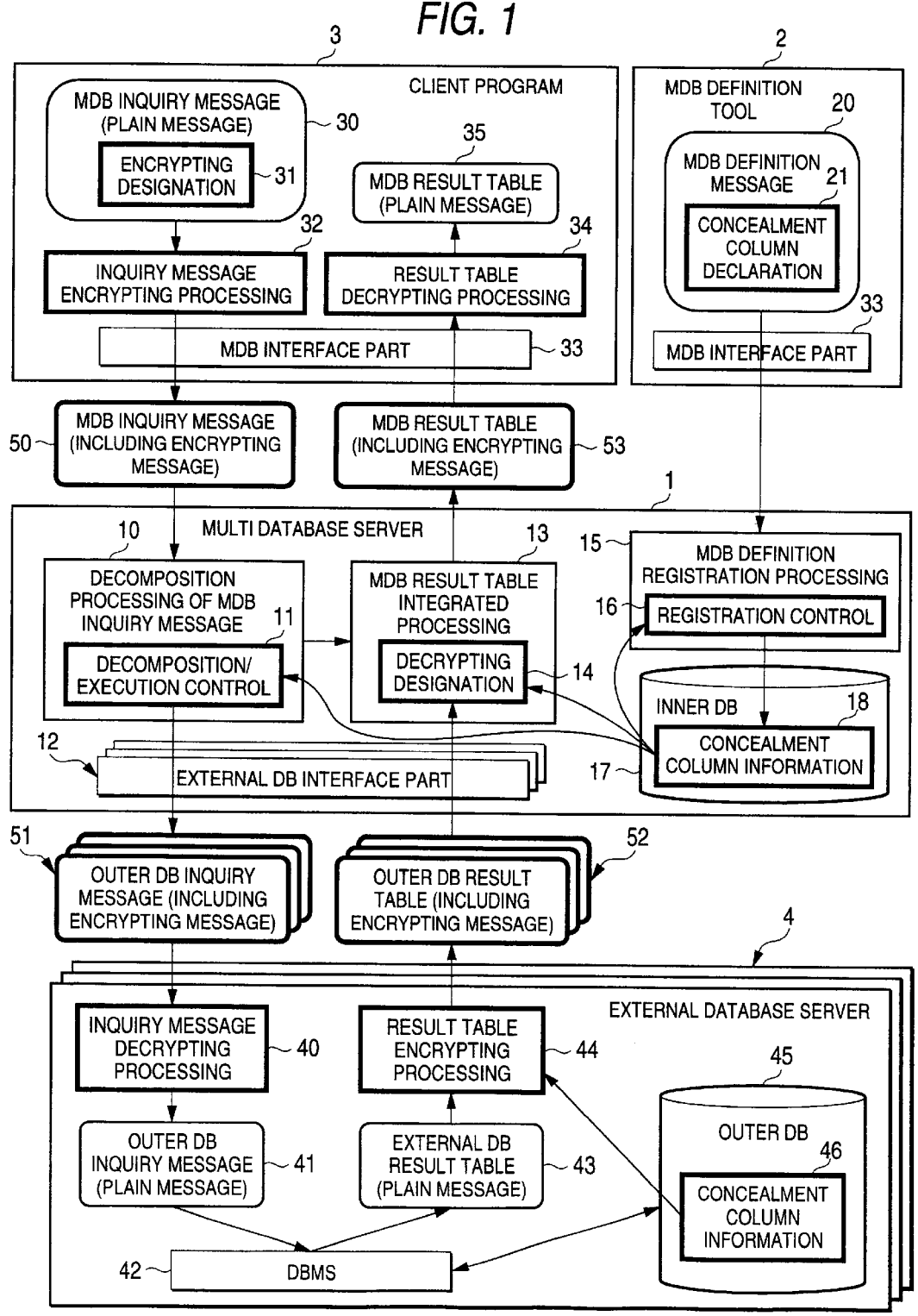
FIG. 1 is an explanatory view expressing a software configuration of a secure multi-database system according to one embodiment of the present invention.

First of all, a schematic configuration of an embodiment of the present invention is explained. A secure multi-database system according to the present invention includes a multi-database definition tool, a multi-database server, at least one client program and an at least one external database server.

Then, means which is employed at the time of defining the multi-database system is explained.

The multi-database definition tool declares columns which are confidential to the multi-database server (concealment columns) out of an external table and registers information on these concealment columns into a dictionary of the multi-database server. Further, the multi-database server controls the definition of a view table and the registration of the definition into the dictionary such that when a user defines the view table using the concealment columns, an arithmetic using the concealment columns is not performed. In this specification, "concealment" includes the alteration of the column into other data form. Further, "concealment" may mean to control the disclosure of the content such as encrypting.

Subsequently, means used at the time of executing the multi-database system is explained.

The multi-database server controls the decomposition and execution of the query messages such that when the users executes the query messages including the concealment columns, the user does not perform the arithmetic using the concealment columns. An external database server executes respective query messages and generates a result table. Further, the external database server encrypts data in the concealment column before returning the result table to the multi-database server. The multi-database server preliminarily sets the query messages such that the arithmetic using concealment columns is not performed so that result tables can be integrated without any problems. Further, for integrating the result tables, a range decrypted by a client program is designated. The client program obtains the integrated result tables and performs decryption within a designated range. Since the data encrypted by the external database server is decrypted by the client program and is referred, it is difficult for the multi-database server to refer to the content of the concealment columns.

Subsequently, a manner for concealing a portion of the query messages from the multi-database server is explained. First of all, the client program designates a range to be encrypted within the query messages. Then, after executing this encrypting, the client program transmits the query messages including the encrypting range to the multi-database server. In the same manner as the previously mentioned processing, the multi-database server performs the decomposition and the execution of the query messages such that the arithmetic related with this encrypting range can not be executed. The external database server extracts and decrypts the encrypted range in the query messages before executing respective query messages.

Subsequently, means to solve tasks in the information mediation system is explained.

The information mediation system is comprised of a mediator, at least one user and at least one information provider. The information providers declare a concealment range to the mediator. The mediator controls the decomposition and the execution of query messages such that when the user executes the query messages contained in the concealment range, the arithmetic using the concealment range is not performed. The information provider executes respective query messages and produces result tables. Further, the information provider encrypts data within the concealment range before returning the result tables to the mediator. Since the mediator preliminarily sets the query messages such that the arithmetic using the concealment range is not performed, the mediator can integrate the result tables without any problems.

Further, for integrating the result tables, the mediator designates a range decrypted by the user. The user acquires the integrated result tables and decrypts the designated range. Since the data encrypted at the information provider side is decrypted and is referred at the user side, it is difficult for the mediator to refer to the content of the concealment range.

The same goes for a method which conceals a portion of the query messages to the mediator. First of all, the user designates a range to be encrypted in the query messages. Then, after executing this encryption, the user transmits the query messages containing the encrypted range to the mediator. In the same manner as the above-mentioned processing, the mediator controls the decomposition and execution of the query messages such that the arithmetic related with this encrypting range is not executed. The information provider extracts the encrypting range in the query messages before executing respective query messages and decrypts them.

The detail of the embodiment is explained hereinafter. First of all, the first embodiment of the present invention is explained hereinafter in conjunction with drawings.

FIG. 1 is an explanatory view showing a software configuration of a secure multi-database system according to one embodiment of the present invention. The secure multi-database system includes a multi-database server 1, a multi-database definition tool 2 (MDB definition tool), a client program 3 and an external database server 4. Although only one client program is described in FIG. 1, it is possible to get access to the multi-database server from a plurality of client programs. Further, as shown in FIG. 1, the multi-database server can get access to a plurality of external database servers.

Hereinafter, the configurations of respective software are explained focusing on the features of the present invention.

First of all, the multi-database definition tool 2 prepares multi-database definition messages (MDB definition message) 20 and registers these definition messages 20 to the multi-database server 1 through a multi-database interface part (MDB interface part) 33. As the multi-database definition messages 20, definitions of an external data wrapper, an external table and a viewer table and the like are named. The present invention is characterized in that when the external DB includes columns to be concealed from the multi-database server (concealment columns), this columns are declared by the MDB definition messages.

Then, the client program 3 prepares query messages to the multi-database (MDB query messages) 30 and encrypts a portion of this query messages 30 in an query message encrypting processing 32 and transmits the query messages 30 to the multi-database server through the MDB interface part 33. Here, the present invention is characterized in that in the MDB query messages 30, the range to be encrypted can be designated (encrypting designation 31), and the encryption is executed based on this encrypting designation 31 in the query encrypting processing 32. Accordingly, a portion of the encrypted messages is included in MDB query messages 50 transmitted to the multi-database server 1.

Further, the client program 3 acquires a result table (MDB result table) 53 of the multi-database including the encrypted messages through the MDB interface part 33 and a portion of the result table 53 is decrypted in the result table decrypting processing 34. Here, since a range to be decrypted is designated in the MDB result table 53, the result table decrypting processing 34 is characterized in that the decrypting is performed based on such a decrypting designation. Accordingly, the MDB result table 35 used in the client program becomes the plain message.

Subsequently, the multi-database server 1 is provided with a multi-database definition registration processing (MDB definition registration processing) 15 and registers the MDB definition message 20 from the MDB definition tool 2 to a dictionary in the inside DB 17 thereof. Here, when the concealment column declaration 21 is contained in the MDB definition message 20, this concealment column declaration 21 is registered in the dictionary as the concealment column information 18. The present invention is characterized in that the registration of MDB definition message is controlled by referring to the concealment column information 18 in the MDB definition registration processing 15. Here, "control" means to suppress the registration of MDB definition message into the dictionary when there exists the MDB definition message which performs the arithmetic using the concealment column in the multi-database server 1. If this registration is freely allowed, since the multi-database server 1 is not informed of the data value of concealment column, an unexpected arithmetic effect may be brought about.

Further, the multi-database server 1 acquires the MDB query message 50 including the encrypted message from the client program 3 and decomposes this MDB query message 50 into query messages (external DB query messages) 51 for every external database server in the MDB query message decomposition processing 10 and supplies them to the external database server 4 through the external DB interface part 12. Here, the external DB interface part 12 corresponds to an external data wrapper. The present invention is characterized in that the decomposition and execution of the MDB query message 50 are controlled by referring to the encrypting designation 30 and the concealment column information 18 in the MDB query message decomposition processing 10. Here, "control" means, for example, to suppress the execution of this MDB query message when there exists the MDB query message which allows the arithmetic using the concealment column to be performed in the multi-database server 1. In the same manner, when there exists the MDB query message which allows the execution of the arithmetic using the encryption designated data value in the multi-database server 1, the execution of this MDB query is suppressed. If this execution is freely allowed, since the multi-database server 1 is not informed of the data value of the concealment column and the encryption designated data value, there is a possibility that an unexpected arithmetic result is brought about.

Further, the present invention is also characterized in that the MDB query message 50 is decomposed into the external DB query messages 51 having the configuration which includes the encrypting designation 31. Accordingly, the external DB query messages 51 to be transmitted to the external database server 4 includes the encrypting designation 31 together with a partial encrypting message.

Further, the multi-database server 1 acquires the external DB result tables 52 including encrypted message from respective external database servers 4, integrates this external DB result tables 52 at the MDB result table integrating processing 13 and transmits the result table 52 to the client program 3. The present invention is characterized in that the range to be decrypted in the client programs 3 is designated in the MDB result table integrating processing 13. Accordingly, the MDB result table 53 transmitted to the client program includes the decrypting designation 14 along with partial encrypting message.

Subsequently, the external database server 4 acquires the external DB query message 51 including the encrypted message and this external DB query message 51 is decrypted by the query message decrypting processing 40 and the external DB query message 41 which is generated by such a decryption and is all made of plain message is transmitted to the DBMS42. The present invention is characterized in that the decryption is performed in accordance with the encrypting designation 31 in the query message decrypting processing 40.

Further, the DBMS 42 generates the external DB result table 43 after executing the query. Although the external DB result table 43 is all formed of plain message, the result table decrypting processing 44 encrypts a portion of the result table by referring to information 46 on the concealment column preliminarily registered in the dictionary of the external DB 45 and thereafter transmits the encrypted result table to the multi-database server 1 as the external DB result table. Accordingly, the external DB result table partially includes the encrypted message.

In FIG. 1, the concealment column information 18 is disposed in the internal DB 17 of the multi-database server 1 and the concealment column information 46 is disposed at the external DB 45 of the external database server 4. The concealment column information 18 is information relating to the concealment column in a range declared as the external table in the multi-database server 1. On the other hand, the concealment column information 46 is information relating to the concealment column included in the external database server 4. The definition and registration of the concealment column information 46 are performed by the external database definition tool or the like not shown in the drawing. Further, in the previously mentioned multi-database definition tool 2, to ensure the consistency with the external database, it is desirable to adopt a mode in which the concealment column is declared by referring to the concealment column information 46. Alternatively, it is preferable to adopt a mode in which the concealment column information 18 is automatically determined based on the concealment column information 46 in a range declared as the external table in the multi-database server 1. Although it may be possible to adopt a mode in which the concealment column of the external database is declared by the multi-database definition tool 2, this becomes a mode in which the declaration is transmitted to the external database server 4 through the multi-database server 1 and hence, this mode is liable to induce an improper processing in the multi-database server 1. Accordingly, it is one of the features of the present invention that the concealment column is declared first at the external database and thereafter the concealment column is declared at the multi-database by reference to the concealment column.

Here, the encrypting system and the decrypting method are explained.

In this embodiment, it is a presumption that the client program 3 and the external database server 4 know the encrypting and decrypting method of the counterpart each other. This is because that it is necessary to perform the decrypting in conformity with the encrypting method of the counterpart.

The first embodiment having the simplest configuration is to integrate the encrypting method and the decrypting method in the multi-database system as a whole. To be more specific, encrypting and decrypting algorithms which are common in respective client programs 3 and the external database server 4 are mounted by a plug-in connection. This embodiment is explained in detail based on this method. The exchange of the key for the encrypting and the decrypting is explained hereinafter.

The second embodiment relates to a case in which an encrypting function is added to an existing external database server 4. In this case, although it is necessary for the client program 3 to specify a result table which is acquired from respective external database servers 4, this operation can be performed by the decrypting designation 14. Since the name of the external database server 4 in which the result table is prepared is described in the decrypting designation 14, the decrypting method can be specified based on this. In this case, it is necessary for the client program 3 to preliminarily know the decrypting method for every external database server 4.

Further, in transmitting the query message including the encrypting range from the client program 3 to the external database server 4, it is necessary to specify the external database server 4 to which the encrypting range is transmitted by the client program 3. In this case, it is necessary to preliminarily make an query to the multi-database server 1 with respect to the external database server 4 to which the query message is transmitted. Once the destination to which the encrypting range is transmitted is found, the range is encrypted in conformity with the decrypting system of the counterpart.

The exchange of key in the second embodiment is substantially as same as the exchange of key of the first embodiment which will be explained hereinafter.

The exchange of key for encryption and decryption is explained hereinafter.

First of all, in this embodiment, two kinds of keys are used, wherein one key is used for encrypting and decrypting the query message and the other key is used for encrypting and decrypting of the result table. Assume a common key encrypting method which uses a same key for encrypting and decrypting. The common key for query message is transmitted from respective client programs 3 to the external database server 4. Further, the common key for result table is transmitted from respective external database servers 4 to the client program 3.

The simplest embodiment is a case in which the exchange of these common keys is performed by means such as letters, telephones or the like without using a network before the query is made. It is necessary that the registration of these common keys to the client programs 3 and the external database servers 4 is safely performed manually. Further, at the time of executing the encrypting or the decrypting, the common keys are specified by a user authentication.

To perform the exchange of key through the network without a manual operation, it is necessary to prevent the common keys from being stolen on the network. An open key encrypting method is used to satisfy this requisite. With respect to the common key for query message, the client program 3 performs the encrypting using open keys of respective external database servers 4 and transmits the encrypted query message to the external database server 4. In the external database server 4, the external database 4 decrypts this encrypted message using its own secret key and obtains the common key. On the other hand, with respect to the common key for result table, respective external data base servers 4 encrypt the result table using the open key of the client program 3 and transmit this encrypted result table to the client program 3. In the client program 3, the client program 3 decrypts this encrypted result table using its own secret key and can obtain the common key. When the open key can be obtained from each other, the security is further enhanced by positively making use of an authentication bureau or the like so as to obtain the open keys with certificates.

When the connection is established from the client program 3 to the multi-database server 1, the user authentication is performed. An access control to the multi-database is performed based on the user authentication. The security is further enhanced by combining the present invention, the user authentication and the access control, for example, by allowing only a proprietor of the table containing the column to perform the declaration of the concealment column. Further, it is needless to say that the query to the table to which the user has no privilege to access is suppressed by the multi-database server.

Also at the time of establishing the connection from the multi-database server 1 to the external database server 4, the user authentication is performed. An access control to the external database is performed based on the user authentication. The security is further enhanced by combining the present invention, the user authentication and the access control, for example, by allowing the concealment column information 46 to open to only a proprietor of the table containing the column.

Figure 2:
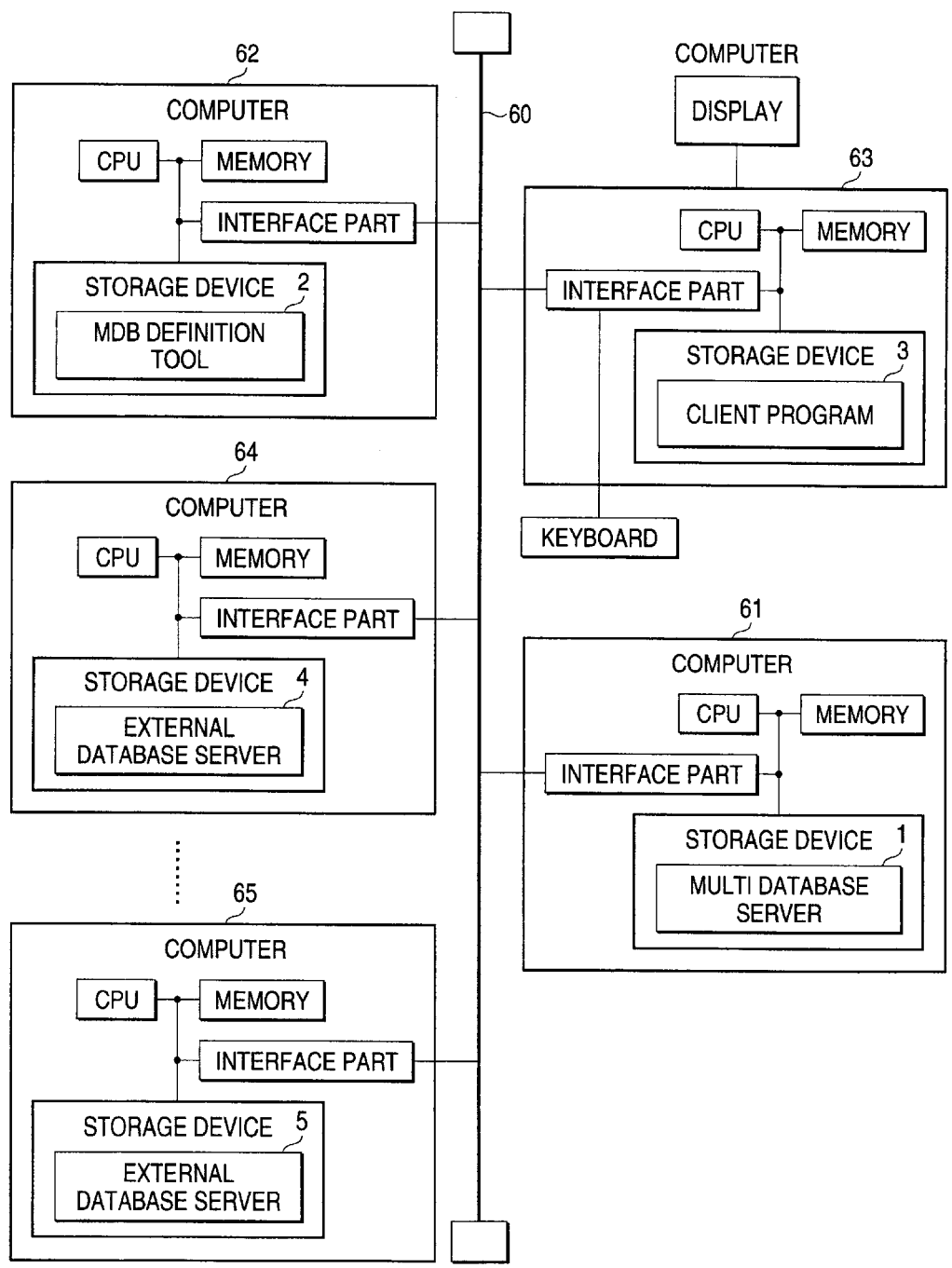
FIG. 2 is an explanatory view showing a hardware configuration of a secure multi-database system according to one embodiment of the present invention.

FIG. 2 is an explanatory view showing a hardware configuration of a secure multi-database system according to one embodiment of the present invention. The secure multi-database system includes computers 61–65 which are respectively connected with each other through a network 60 and respective software which are explained in FIG. 1 are arranged in respective computers. Although respective softwares are arranged in respective individual computers in the drawing, a plurality of softwares may be arranged in the same computer. Further, although only one client program and two external database servers are described in the drawing, it may be possible to provide a configuration which includes more client programs and external database servers. Assuming an application mode shown in FIG. 17, the network 60 becomes a WAN (Wide Area Network). However, the present invention is applicable to a LAN (Local Area Network) in the same manner. As shown in the drawing, each computer includes a processing device (processor) such as a CPU, a memory, a storage device which stores a program, an interface which performs a transmission/reception of information between the computer and the network and paths which connect them. Further, each computer may be provided with an output device such as a display device including a display and an input device such as a keyboard, a mouse or the like which accepts an input from a user. Further, an MDB definition tool 2 and a client program 3 may be provided to the same computer.

FIG. 3 is an explanatory view showing an application example of the secure multi-database system according to one embodiment of the present invention. Further, FIG. 4 to FIG. 8 describe contents related with this application example. The contents of the application example are explained hereinafter.

First of all, as the external databases, an A company data base 4 (database name being A_DB) and a B company data base 5 (database name being B_DB) are provided. Respective databases hold a table 90 (table name being A1) and a table 95 (table name being B1) relating to the transaction information. Further, respective table have the equal configuration and each table includes a date column 91, a sales company name column 92, a client name column 93 and a transaction amount column 94.

Subsequently, the multi-database server 1 declares the tables 90, 95 as the external tables and a view table 80 (table name being aaa1) where the client name is aaa company is defined. Here, the view table 80 is a virtual detailed slip in which the transaction details extending over sales companies A and B are merged exclusively with respect to the client aaa. The view table is constituted by a date column 81, a sales company name column 82 and a transaction amount column 83. Here, since the data in the transaction amount column 83 is confidential information not only for the client but also for the sales company, it must be concealed from the multi-database server. In this example, it is assumed that a range 84 is encrypted (that is, concealed).

Then, in the client program 3, the encrypted range 84 in the view table 80 is decrypted and a view table 70 in which all data are in plain messages is provided.

FIG. 4 and FIG. 5 show an example of a multi-database definition message 20.

First of all, FIG. 4 is an explanatory view showing an example of a definition message 99 of the external table in the secure multi-database system according to one embodiment of the present invention. To be more specific, FIG. 4 shows the definition message for registering the tables 90, 95 described in FIG. 3 in the multi-database server. In this embodiment, a declarator 21 which is called ENCRYPTED is used. The invention is characterized in that the external database server declares a column which is concealed from the multi-database server. Here, the concealment column information 46 preliminarily defined in the external database is referred.

Subsequently, FIG. 5 is an explanatory view showing an example of a definition message 100 of the view table in the secure multi-database system according to one embodiment of the present invention. To be more specific, FIG. 5 shows the definition message for registering the view table 80 described in FIG. 3 in the multi-database server. As shown in this example with respect to the table of the external database which is declared as the external table, the view can be defined in the same manner as an internal table.

Further, although not shown in the drawing, a definition message which registers the external database server and a definition message which changes or deletes definition information registered in the multi-database server are present.

Figure 6:
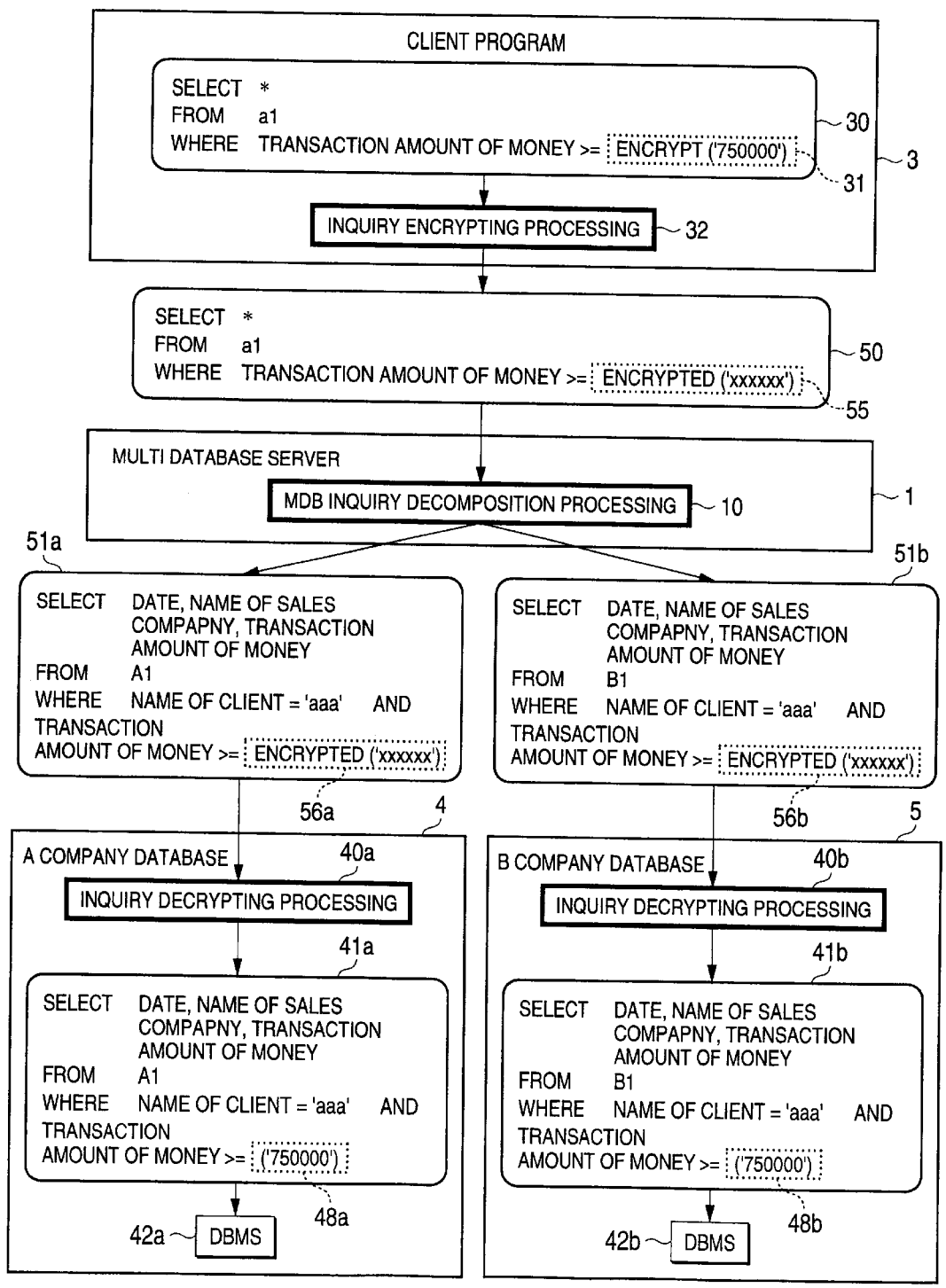
FIG. 6 is an explanatory view showing a processing flow of query messages in a secure multi-database system according to one embodiment of the present invention employing a use example.

FIG. 6 is an explanatory view showing a processing flow of an query message in the secure multi-database system according to the present invention using an application example.

First of all, in the client program 3, an MDB query message 30 which selects records of transaction amount of not less than 750000 from a view table la is generated. The present invention is characterized in that, in the client program 3, a range encrypted in the MDB query message 30 is designated to the multi-database server 1 using a declarator 31 called ENCRYPT. The encrypting range surrounded by the ENCRYPT declarator is usually a constant in retrieval conditions.

In the query encrypting processing 32, this ENCRYPT declarator 31 is extracted and the encrypting range is specified. In the MDB query message 50, a constant surrounded by the ENCRYPTED declarator 55 indicates the encrypted range. Here, the reason for using the ENCRYPT declarator 31 and the ENCRYPTED declarator 55 separately is that the program can classify the range to be encrypted and the range to be decrypted.

Subsequently, in the multi-database server 1, the MDB query decomposition processing 10 decomposes the MDB query message 50 into individual query messages 51a, 51b which are transmitted to the respective external database servers. In the drawing, the column name and the table name are specified and a condition to retrieve records having the client name of aaa is added. Further, in the retrieval condition relating to the transaction amount, an ENCRYPTED declarator 56 is used as in the case of the MDB query message.

Then, in the external databases 4 and 5, the query decrypting processing 40a and 40b extract the ENCRYPTED declarator 56 and decrypt the constant surrounded by the declarator 56. As a result, a constant 48 indicative of 750000 is acquired and an query message 41 which can be processed at each DBS42 can be generated.

Besides the SELECT message, an INSERT message, a DELETE message and an UPDATE message are processed in accordance with a similar flow of processing. Particularly, with respect to the INSERT message and the UPDATE message, not only the constant in the retrieval conditions but also data values to be inserted or updated are encrypted. Due to such a method, the present invention is characterized in that the contents which are added or updated in the external databases can be concealed from the multi-database server 1 in view of an application example.

Figure 7:
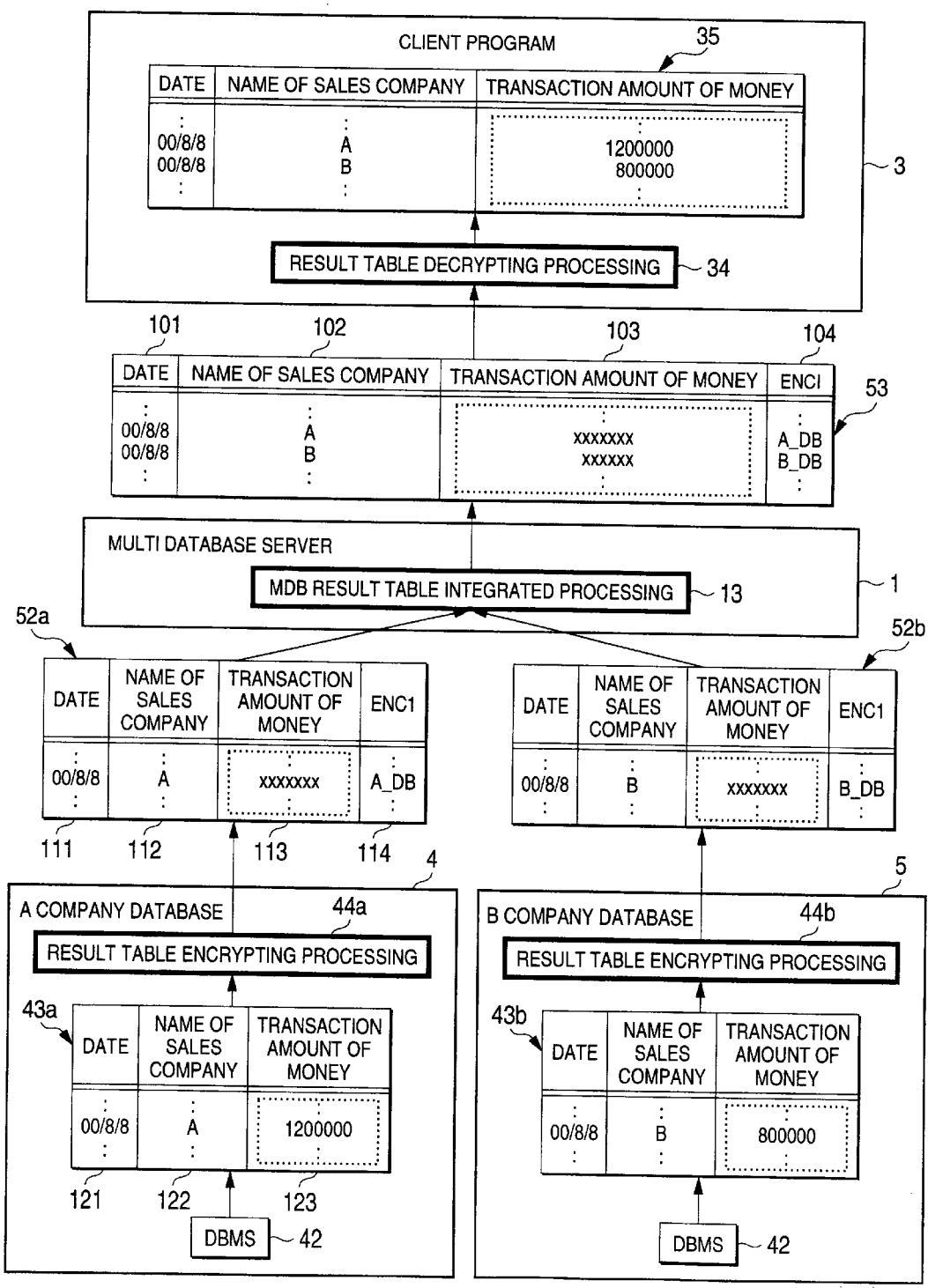
FIG. 7 is an explanatory view showing a processing flow of result tables in a secure multi-database system according to one embodiment of the present invention employing a use example.

FIG. 7 is an explanatory view showing a processing flow of the result table in the secure multi-database system according to one embodiment of the present invention. FIG. 7 shows a result to the query of FIG. 6.

First of all, in the external databases 4 and 5, result table encrypting processing 44a, 44b encrypt data values of concealment columns of the external DB result tables 43 which are results of execution at respective DBMS 42. In this example, the transaction amount columns 123 become the concealment columns. Accordingly, as shown in the external DB result tables 52a, 52b, the data values of the transaction amount columns 113 are encrypted so that they cannot be referred from other means. Further, the present invention is characterized in that ENCRYPTED columns 114 (column name being ENC1) are added to specify the range that result table encrypting processing 44a, 44b encrypt. In this example, FIG. 7 shows that the concealment columns are included in the transaction amount columns 113 disposed at the left side of the ENCRYPTED columns 114 and the range of encrypted records is indicated by the database name in the inside of the ENCRYPTED columns 114. When this column 114 is Null, this implies that the same records in the column at the left side of the ENCRYPTED columns 114 is not encrypted. The above is a processing for easily specifying the encrypted range when the concealment column and the non-concealment column are merged. That is, the processing is provided for easily specifying the decrypted keys when decrypted keys are different every database.

Subsequently, in the multi-database server 1, the MDB result table integration processing 13 integrates respective external DB result tables 52a and 52b. According to the definitions of the view table described in FIG. 5, since this view table indicates the merger of external tables, the processing performed at the MDB result table integration processing 13 becomes the merging processing of the external DB result tables 52a and 52b. Here, the transaction amount column 103 and the ENCRYPTED column 104 which contain the encrypted data are also merged so that the MDB result table 53 can be obtained.

Then, in the client program 3, the result table decrypting processing 34 refers to the ENCRYPTED column 104 of the MDB result table 53 and decrypts the data values of the transaction amount column 103 at records having data values other than Null. That is, the ENCRYPTED column 104 functions as decrypting designation 14. Then, an MDB result table 35 formed of only plain messages is obtained.

When it is necessary to ensure the consistency of data in the inside of the concealment column acquired from the external database, the data conversion is performed before performing the encrypting processing at the external database server or after performing the decrypting processing at the client program.

FIG. 8 is an explanatory view showing an application example of external table definition information in the secure multi-database system according to one embodiment of the present invention. To be more specific, FIG. 8 shows the external table definition information relating to definition messages 99 of the external table described in FIG. 4. Although the present invention is similar to the conventional multi-database system on a point that the multi-database system includes respective definition information consisting of a DB name 131, a table name 132, a column name 133, a data type 134, a data length 135, an accuracy 136, a NULLABLE 137 and the like, the present invention is characterized in that information relating to the concealment column of the external table is administrated at an ENCRYPTED column 138. The example shown in FIG. 8 indicates that the column name "transaction amount" is declared as the concealment column in the table name "A1" of the DB name "A_DB" and the column name "transaction amount" is declared as the concealment column in the table name "B1" of the DB name "B_DB".

FIG. 9–FIG. 16 are explanatory views showing flows of processing of the secure multi-database system according to one embodiment of the present invention. Respective processing are explained hereinafter step by step.

Figure 9:
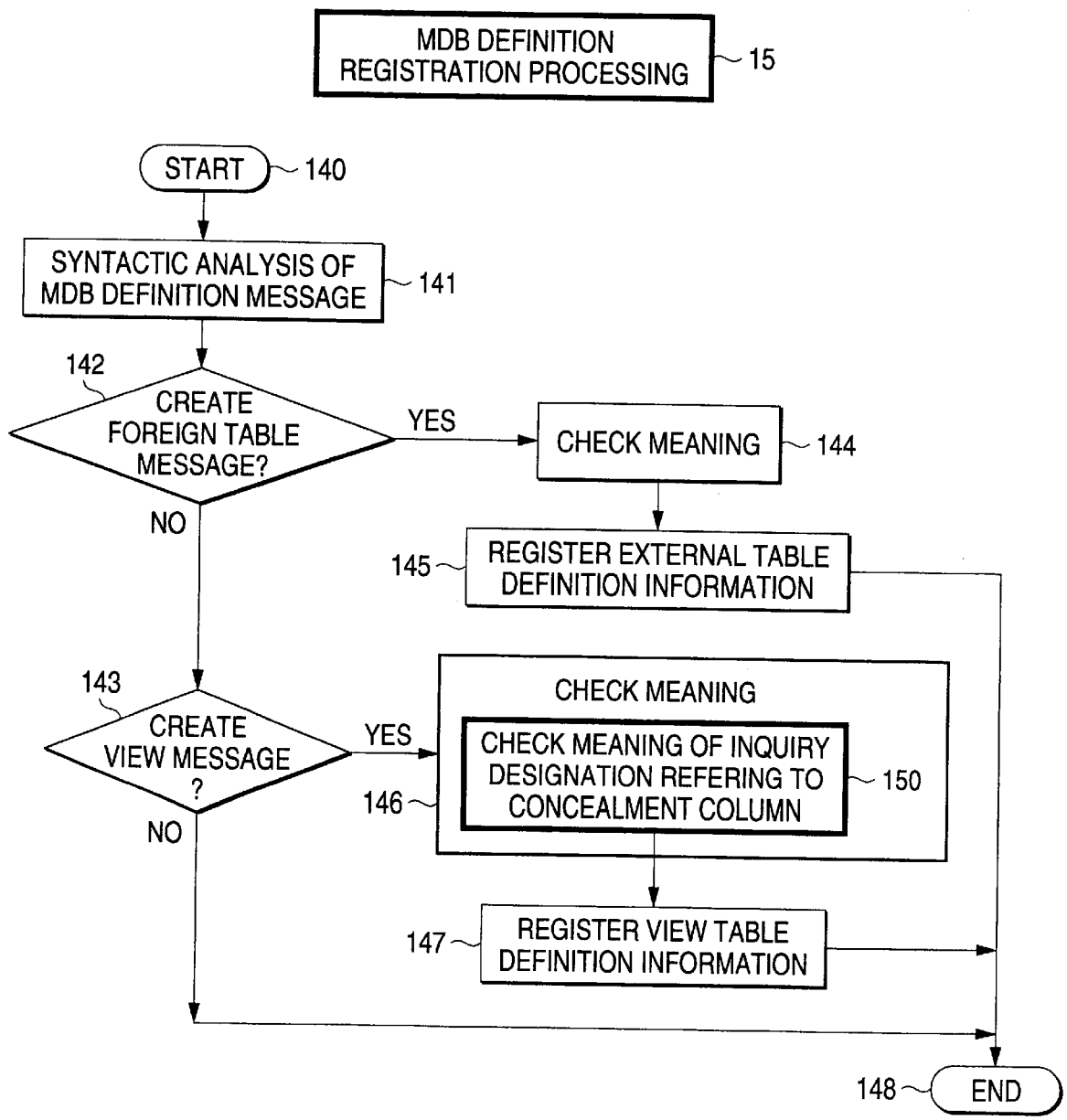
FIG. 9 is an explanatory view showing a flow of an MDB definition registration processing in a secure multi-database system according to one embodiment of the present invention.

FIG. 9 shows the flow of the MDB definition registration processing 15. First of all, in step 141, the syntactic analysis of the MDB definition message to be registered is performed. Subsequently, in steps 142–143, the processing is branched for every syntactic. In FIG. 9, only the MDB definition registration processing relating to the features of the present invention is described.

In a CREATE FOREIGN TABLE message of step 142, the definition message described in FIG. 4 becomes a subject. First of all, in step 144, the meaning check of this definition message is performed. Here, the meaning check is a processing which checks whether the external DB quoted in the definition message properly exists in the inside of a dictionary or not, whether a table which has the same name has already existed or not and the like. Subsequently, in step 145, only when the external DB properly exists in step 144, the definition message is registered in the dictionary as the external table definition information. An ENCRYPTED declarator is also neatly analyzed and a transaction amount column surrounded by the declarator is registered as a concealment column.

In a CREATE VIEW message of step 143, the definition message 100 described in FIG. 5 becomes a subject. As in the case of the CREATE FOREIGN TABLE message, a meaning check 146 and a registration 147 in a view table definition information are performed. In the view table, when the concealment column of the external table is used in the query designation, since the multi-database server can not refer to the data of the concealment column, there may be a case that the manipulation of the view table can not be performed. Accordingly, a meaning check 150 of the query designation by reference to the concealment column is provided.

Figure 10:
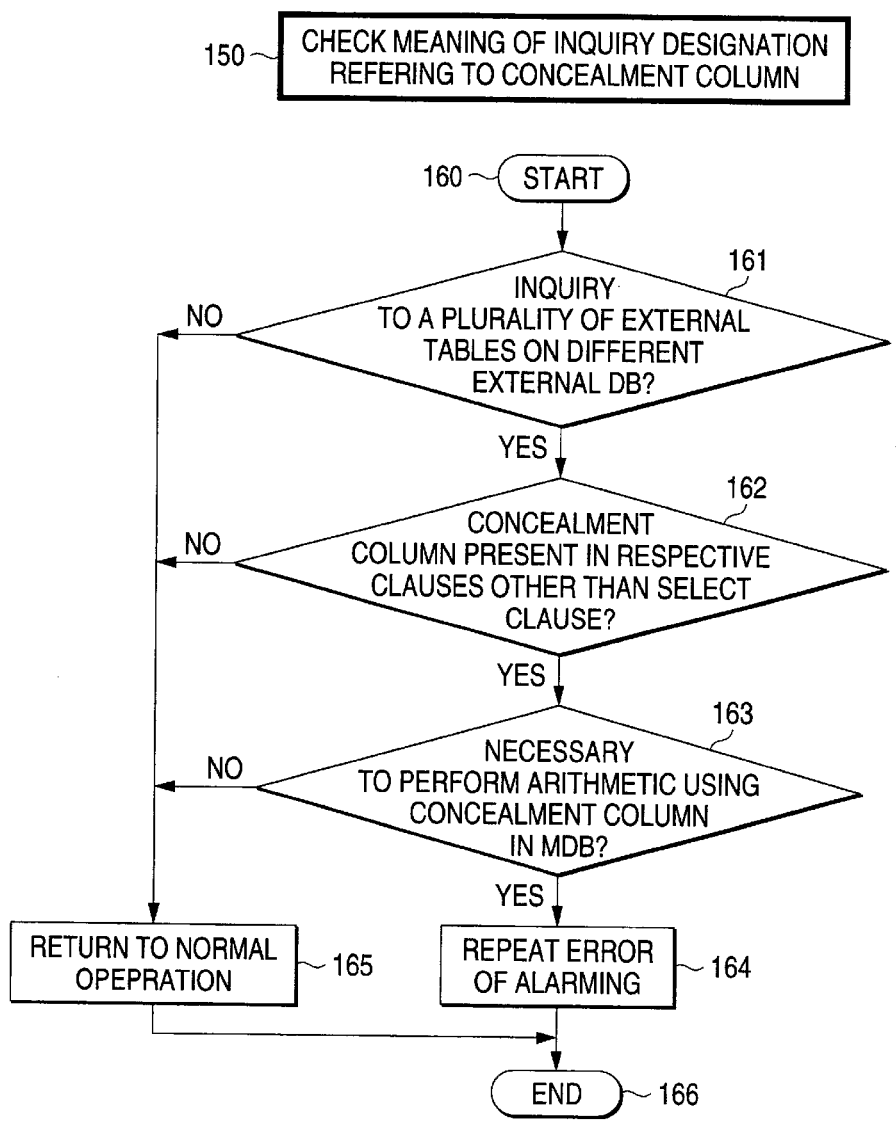
FIG. 10 is an explanatory view showing a flow of a meaning check processing with designation of inquiries in conjunction with concealment columns in a secure multi-database system according to one embodiment of the present invention.

FIG. 10 shows the flow of processing of the meaning check 150 of the query designation by reference to the concealment column shown in FIG. 9. In step 161, the query designations corresponding to a plurality of external tables on different external DB are extracted. This means that even when one external table or a plurality of external tables are provided, so long as these external tables are disposed in the same external DB, the query designations by reference to the concealment column can be directly transmitted to the external DB and processed there without any problems. Here, a problem that an accurate arithmetic can not be performed properly when the query designation by reference to the concealment column is transmitted over a plurality of external DBs can be solved.

Then, in step 162, the query designation in which the concealment columns are present in respective clauses other than a SELECT clause is extracted. Subsequently, in step 163, the query designation in which it is necessary to perform an arithmetic using the concealment column in the multi-database server is extracted.

As an example which performs an arithmetic using the concealment column, a case in which the concealment column is used as a coupling condition in the query message which couples the external tables, a case in which, in a sub-query including the external table, a result of the sub-query becomes the concealment column, a case in which the concealment column is used as a GROUP BY clause or a ORDER BY clause in an query message which performs a set arithmetic of the external tables, a case in which a set difference or a set product is performed against external table including the concealment columns and the like are considered.

There may be a case that even an arithmetic using the concealment column can be properly processed using the multi-database server 1. For example, depending on the encrypting method (the encrypting method which directly follows the mathematical characteristics of plain messages), the comparison of the magnitude, the equivalence and the like can be performed such as a case which compares both concealment columns. Particularly, when the same encrypting key is used, the comparison of equivalence of the concealment columns can be performed. In such a case, a mode which becomes an exception of step 163 may be considered.

Finally, to the query message including the query designation detected in step 163, an error or an alarm is generated in step 164 so as to control the execution of query message. With respect to other query messages, the execution of these query messages is continued without any change.

Figure 11:
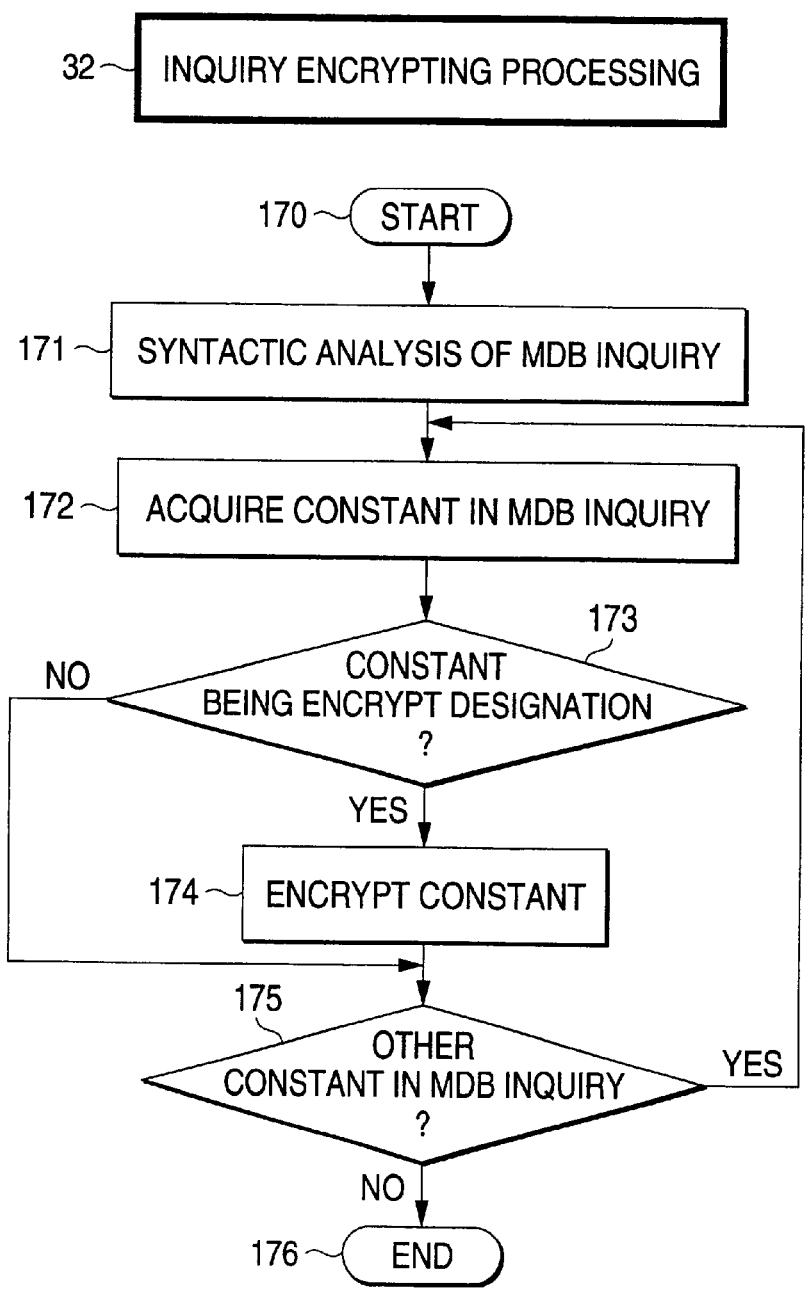
FIG. 11 is an explanatory view showing a flow of an query message encrypting processing in a secure multi-database system according to one embodiment of the present invention.

FIG. 11 shows the flow of query message encrypting processing 32. First of all, in step 171, a syntactic analysis of MDB query message is performed. Subsequently, in step 172, constants in the inside of the MDB query message are acquired. If the designation by the ENCRYPT declarator is provided to the constants, the constants are encrypted in step 174. Steps 172–174 are executed with respect to all constants in the MDB query message.

Although the mode in which the ENCRYPT declarator is designated to the constants is adopted in this embodiment, the same flow of processing shown in FIG. 11 is executed when the ENCRYPT declarator is designated to other items.

Figure 12:
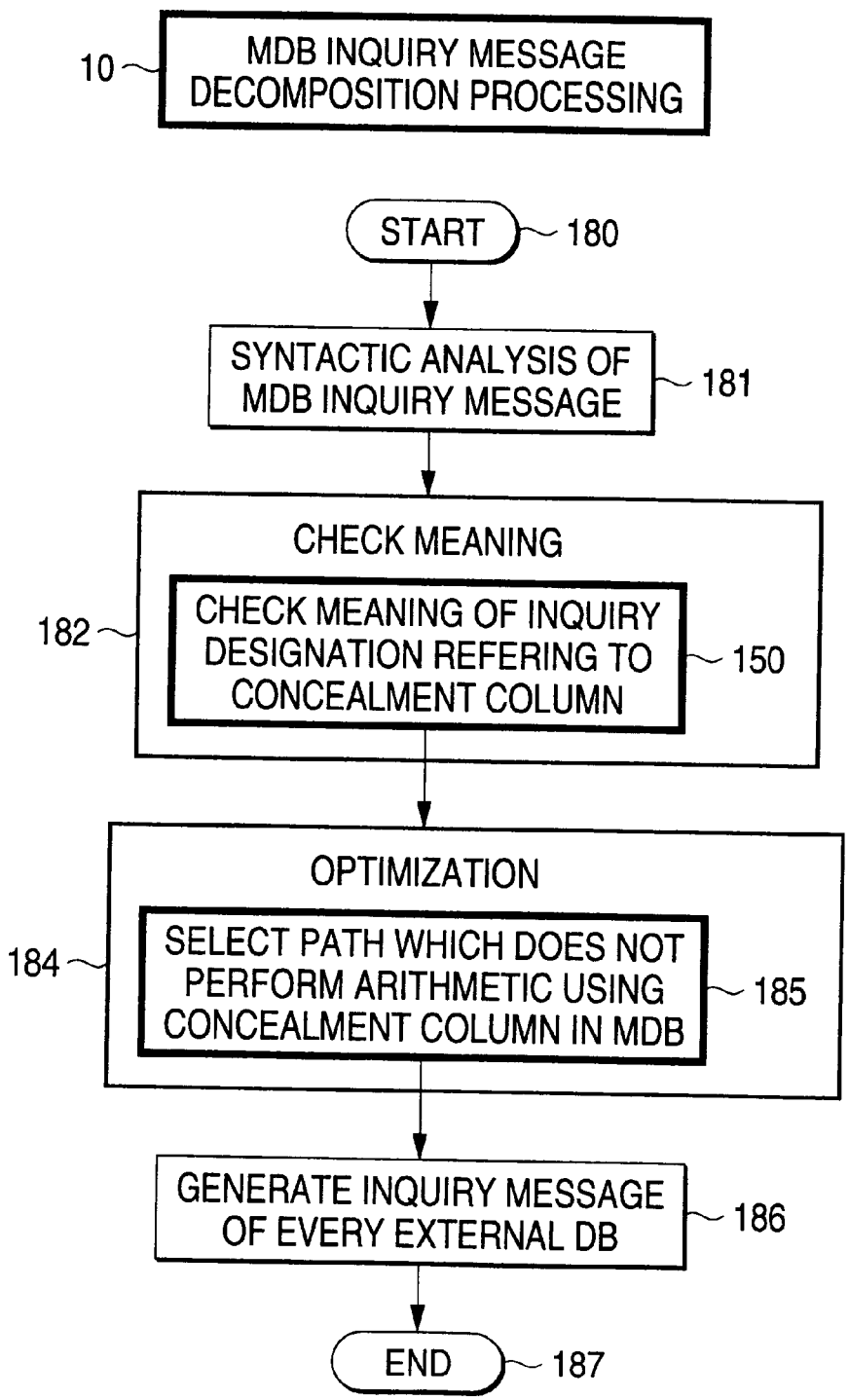
FIG. 12 is an explanatory view showing a flow of an MDB query decomposition processing in a secure multi-database system according to one embodiment of the present invention.

FIG. 12 shows the flow of query message decomposition processing 10. First of all, in step 181, a syntactic analysis of the MDB query message is performed. Subsequently, in step 182, as in the case of the previously mentioned view table definition, when the concealment column of the external table is used in the query designation, since the multi-database server can not refer to the data of the concealment column, there may be a case that MDB query message can not be executed. Accordingly, the meaning check 150 of the query designation by referring to the concealment column is performed and the execution of the MDB query message is controlled. Subsequently, in step 184, an access path at the time of decomposing the MDB query message is optimized. Here, the control is performed such that the path which does not perform the arithmetic using the concealment column in the multi-database server is selected. For example, with respect to the query message which includes the sub-query, to enhance the performance, the path in which the main query message and the sub-query message are processed by respective external DBs in parallel and respective results are again processed by multi-database server is considered. However, when the main query message includes the concealment column and the sub-query message does not include the concealment column, a path which transmits the result of the sub-query message along with the main query message to the external DB is selected. Finally, in step 186, the query message for every external DB is generated.

The present invention is characterized in that at the time of decomposing the MDB query message into the query messages of respective external DBs, a control is performed such that an arithmetic using the concealment column is not executed by the multi-database server. As a result, the multi-database server can integrate the external result tables even when the multi-database server is not informed of the content of the concealment column without any problems.

Figure 13:
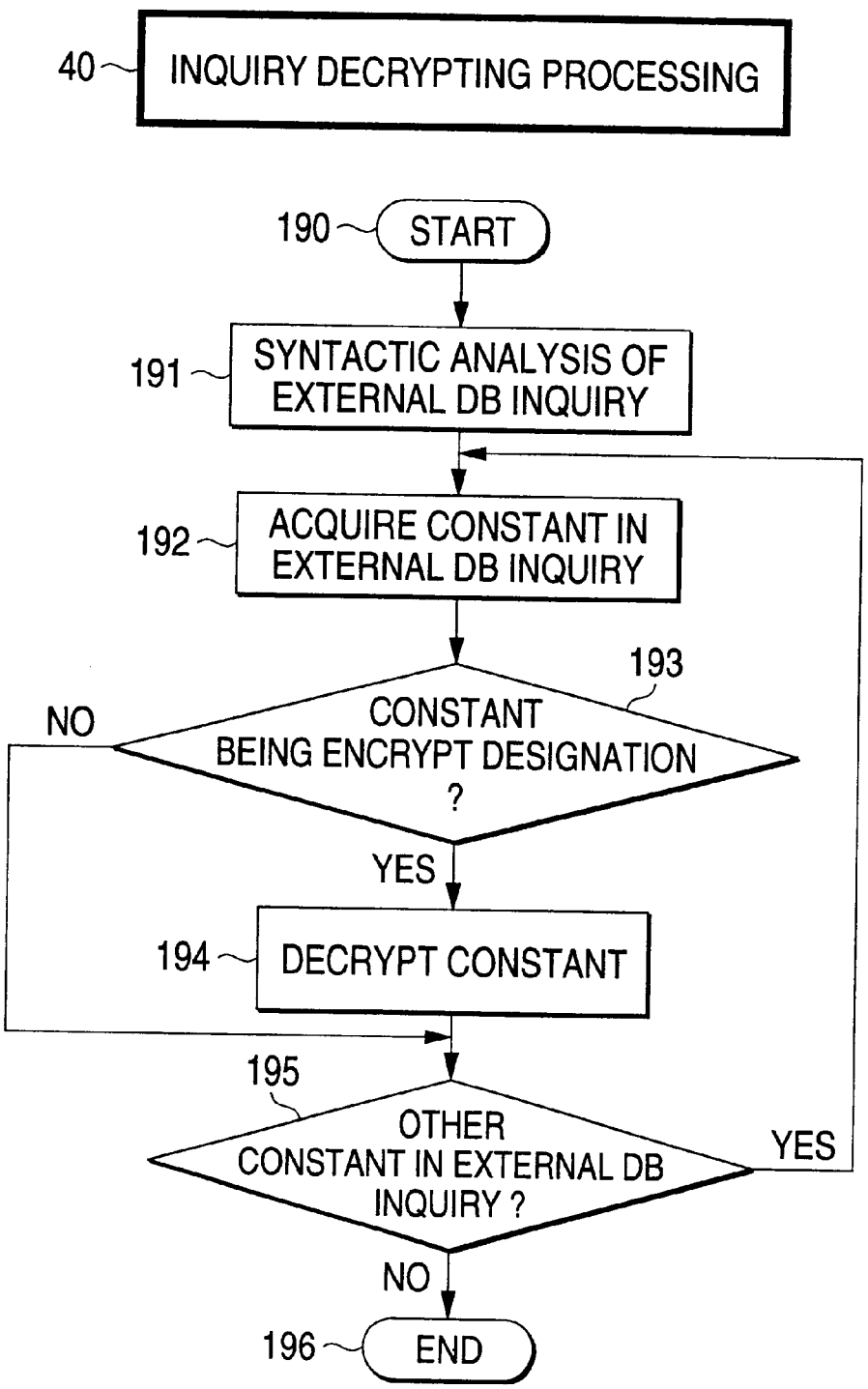
FIG. 13 is an explanatory view showing a flow of an query message decrypting processing in a secure multi-database system according to one embodiment of the present invention.

FIG. 13 shows the flow of query decrypting processing 40. First of all, in step 191, a syntactic analysis of the external DB query message is performed. Subsequently, constants in the inside of the external DB query message can be obtained in step 192. Then, in step 193, when the designation by the ENCRYPTED declarator is provided to the constants, the constants are decrypted in step 194. The steps 192–194 are executed to all constants in the inside of the external DB query message.

Although a mode in which the ENCRYPTED declarator is designated to the constants is adopted, even when the ENCRYPTED declarator is designated to other items, the same processing flow shown in FIG. 13 can be executed.

Figure 14:
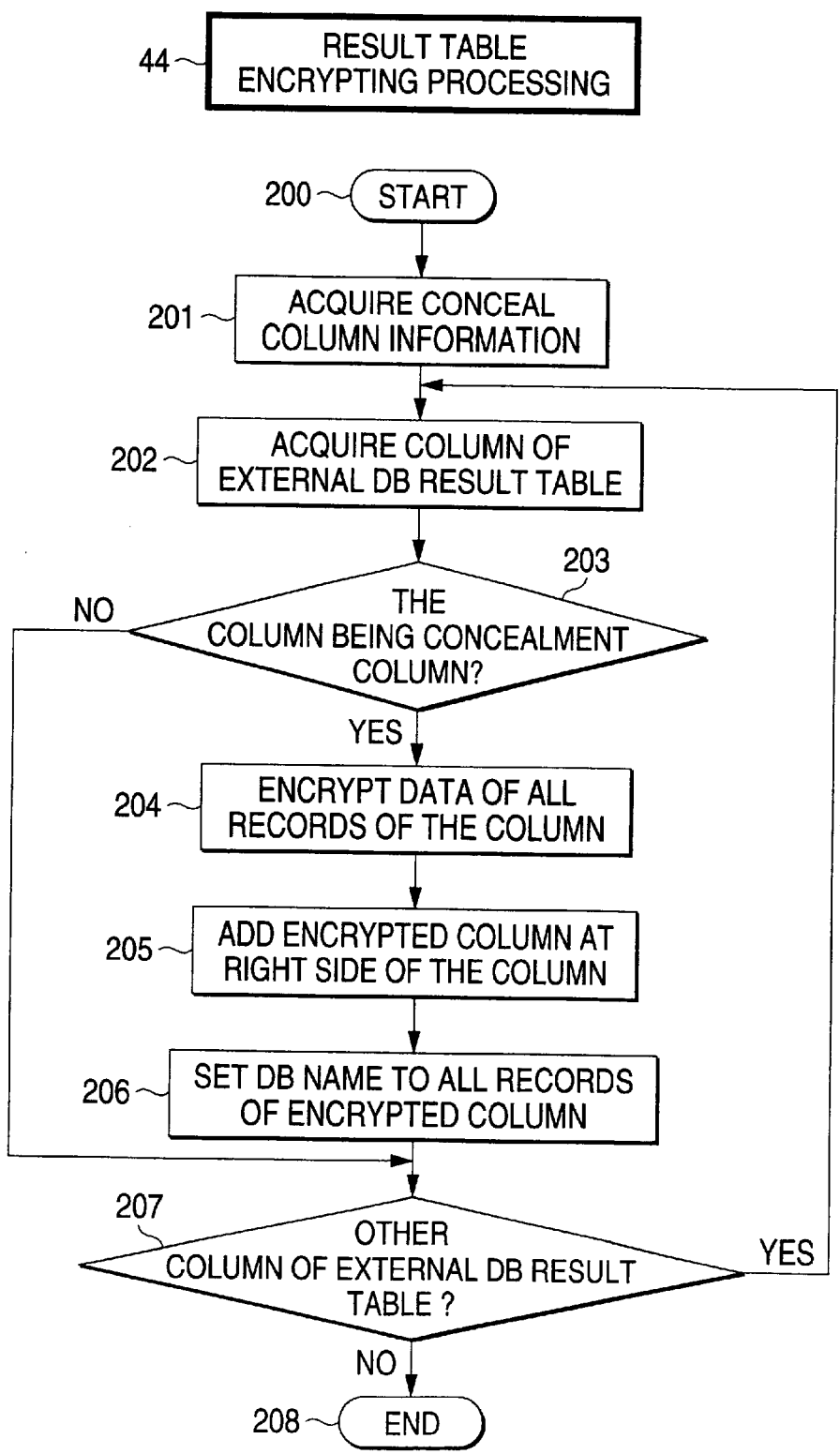
FIG. 14 is an explanatory view showing a flow of a result table encrypting processing in a secure multi-database system according to one embodiment of the present invention.

FIG. 14 shows the flow of result table decrypting processing 44. First of all, in step 201, information of the concealment column is acquired. Following steps 202–206 are processing which are executed to all columns of the external DB result table. In step 202, the columns of the external DB result table are acquired. In step 203, whether the column is the concealment column or not is judged. If the column is the concealment column, data of all records of the column are encrypted in step 204. Then, in step 205, an ENCRYPTED column is added to the right side of the column. In step 206, to indicate that the data of the concealment column has been encrypted, data of the ENCRYPTED column are set in a database name. As mentioned previously, since the steps 202–206 are processing executed to all columns of the external DB result table, it is judged whether other columns remain in step 207 or not.

Figure 15:
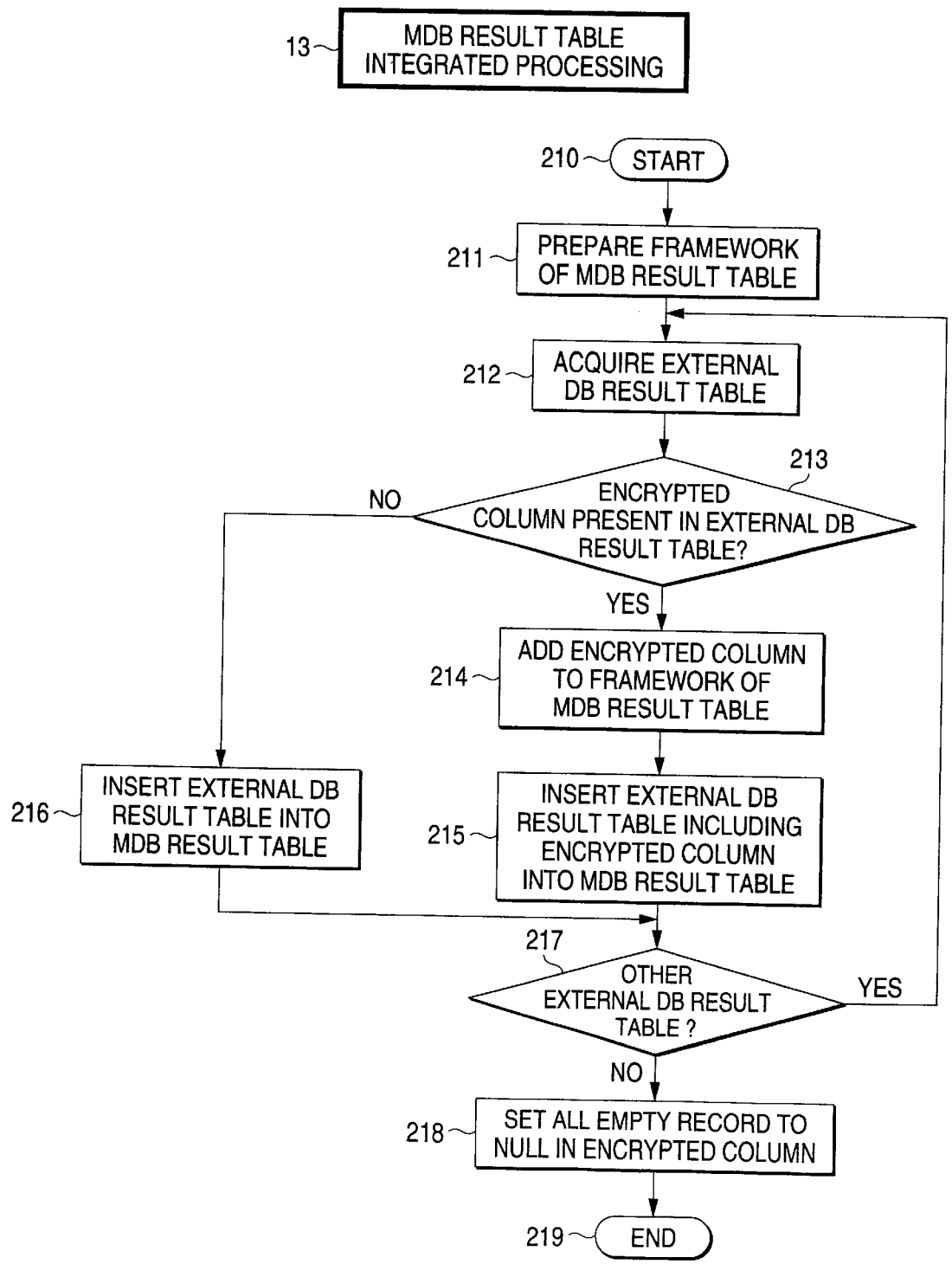
FIG. 15 is an explanatory view showing a flow of an MDB result table integration processing in a secure multi-database system according to one embodiment of the present invention.

FIG. 15 shows the flow of the processing of the MDB result table integration processing 13. First of all, in step 211, a framework of the MDB result table is prepared in accordance with the result of the MDB query message decomposition processing 10. Subsequently, in step 212, the external DB result tables are acquired from respective external DBs. Then, in step 213, it is judged whether the ENCRYPTED columns are present in the external DB result tables or not. If the ENCRYPTED columns are not present, the external DB result tables are inserted into the MDB result table in accordance with the framework. If the ENCRYPTED columns are present, in step 214, the ENCRYPTED columns are added to the framework of the MDB result table. Then, in step 215, the external DB result tables are inserted into the MDB result table in a form that the ENCRYPTED columns are included in the external DB result table. The above-mentioned processing of steps 212–216 are executed to all external DB result tables acquired by the multi-database server. In step 217, the judgment to this end is executed. Finally, in step 218, empty records are all set to Null in the ENCRYPTED columns. The above is a processing performed at the time of integrating the external DB result tables which do not have the ENCRYPTED columns and the external DB result tables which have the ENCRYPTED columns.

Figure 16:
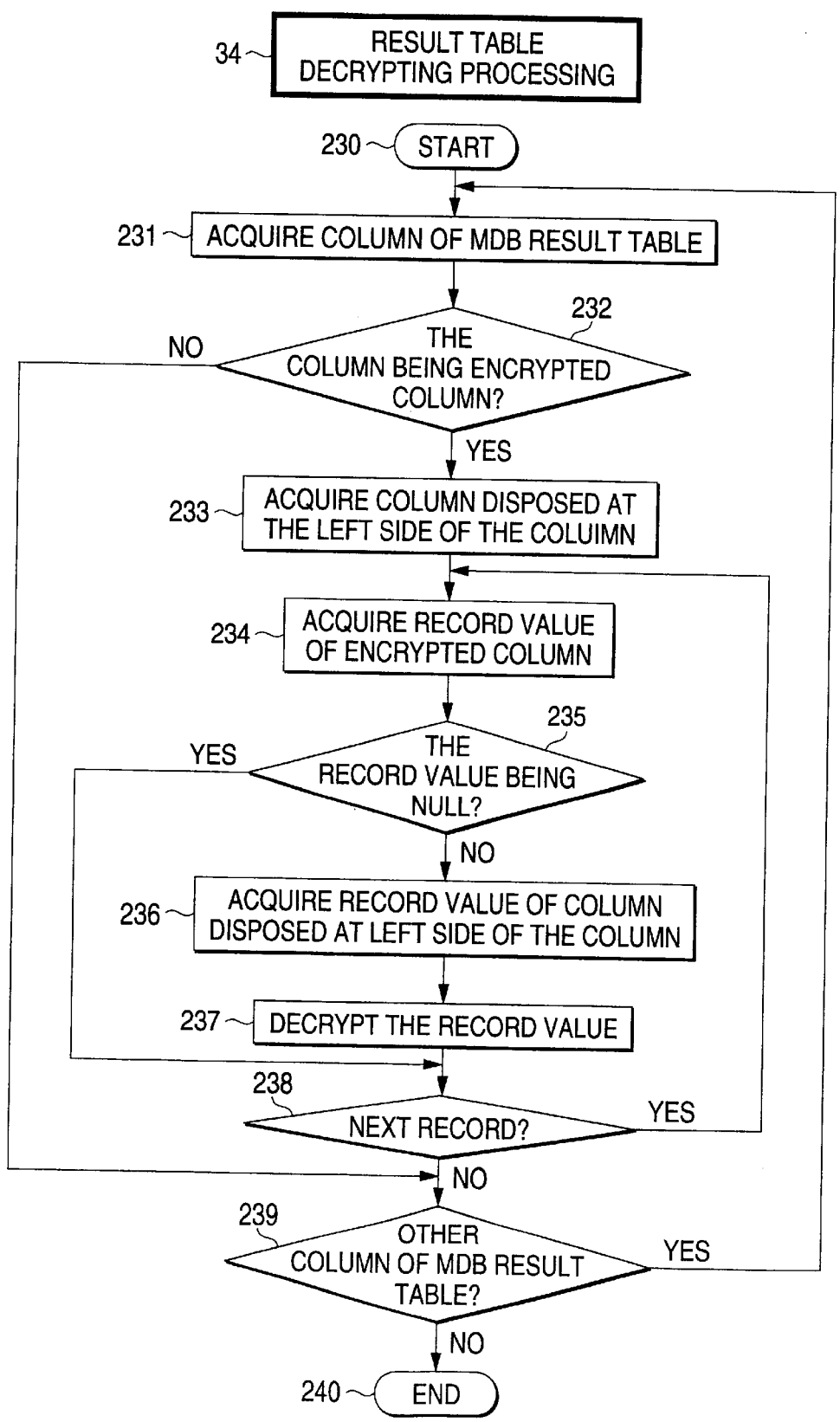
FIG. 16 is an explanatory view showing a flow of a result table decrypting processing in a secure multi-database system according to one embodiment of the present invention.

FIG. 16 shows the flow of the result table decrypting processing 34. First of all, in step 231, the columns of MDB result tables are obtained. Subsequently, in step 232, it is judged whether the columns are ENCRYPTED columns or not. When the columns are the ENCRYPTED columns, the processing of steps 233–238 are executed. When the columns are not ENCRYPTED columns, the processing advances to step 239. In step 233, the columns disposed at the left side of the columns are acquired. According to the processing which have been explained heretofore, the encrypted data should be included in the column disposed at the left side of the column. In step 234, the record values of the ENCRYPTED columns are acquired. In step 235, it is judged whether the record values are database names or Null. When the record values are database names, following steps 236–237 are repeated. When the record values are Null, the processing advances to step 238. In step 236, the record values of the column disposed at the left side of the column are acquired. Since it is assumed that the record values are encrypted in step 237, these record values are decrypted. In this case, since decrypting keys are different every database, the database names are given to keys. In step 238, it is judged whether other records are present or not and when the other records are present, steps 234–237 are repeated. Further, in step 239, it is judged whether columns of other MDB result tables are present or not and when the columns are present, steps 231–238 are repeated.

Figure 17:
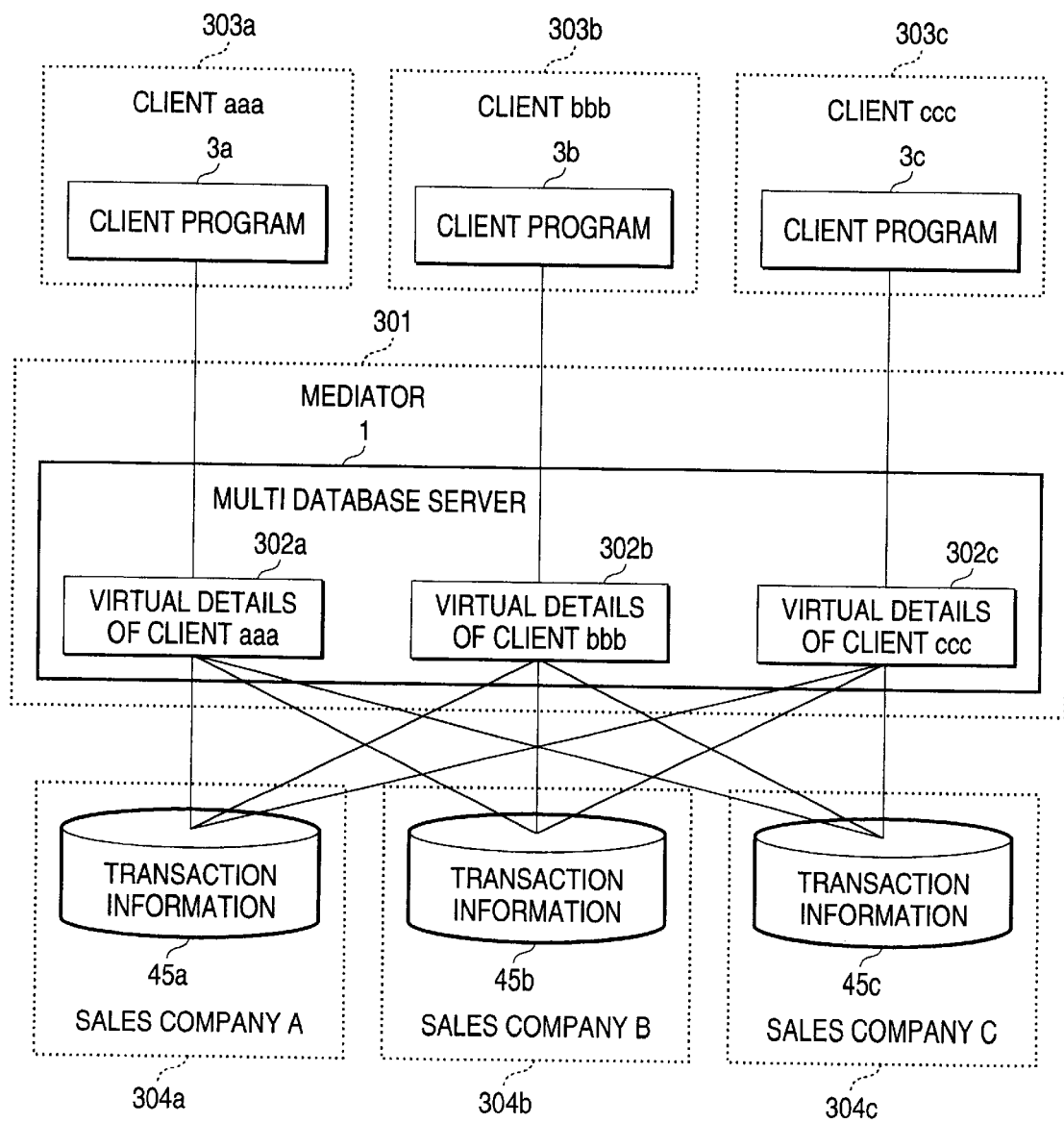
FIG. 17 is an explanatory view showing an entire configuration of an information mediation system according to one embodiment of the present invention.

FIG. 17 is an explanatory view showing the configuration of an information mediation system according to the second embodiment of the present invention.

The information mediation system virtually integrates information sources which are distributed on a network and provides an unitary access path to users. Since the designations to which inquiries are made can be arranged in one, when viewed from the users, an advantageous effect that the availability of the system is increased can be obtained.

In FIG. 17, a mediator 301 provides an access path to a sales company A 304a, a sales company B 304b and a sales company C 304c as virtual detailed statement slip 302a–302c to an aaa company 303a, a bbb company 303b and a ccc company 303c which constitute client enterprises. The substance of the virtual detailed statement slips is a view table which declares transaction information 45a, 45b and 45c as external tables in a multi-database server 1 and merges respective client enterprises into a key. Inquiries from clients 3a, 3b, 3c are transmitted to respective DB 45a–45c through the multi-database server 1 and the query result tables (result tables) are integrated and returned to respective clients.

A method for concealing contents of the virtual detailed statement slips transacted between the client enterprises 303 and the sales companies 304 from a mediator 301 is as follows.

First of all, the sales companies 304 declare a range to be concealed against the mediator 301. The mediator 301 controls the decomposition and the execution of query messages such that the client enterprises 303 do not perform an arithmetic using the concealed range at the time of executing the query messages including the concealed range. The sales companies 304 execute respective query messages and generate individual detailed statement slips. Further, the sales companies encrypt data within the concealed range before returning the detailed statement slips to the mediator 301. Since the query messages are preliminary set such that the arithmetic using the concealed range can not be performed, the mediator 301 can integrate the detailed statement slips without any problems. Further, in integrating the detailed statement slips, the range to be decrypted is designated in the client enterprises 303. The client enterprises 303 acquire the integrated detailed statement slips, that is, virtual detailed statement slips and decrypt the designated range. Since the data encrypted at the sales company 304 side are decrypted and referred at the client enterprises 303 side, it is difficult for the mediator to refer to the contents of the concealed range.

Then, a method which conceals a portion of query messages against the mediator 301 is explained. First of all, the client enterprise 303 designates a range to be encrypted within the query message. Then, after executing this encrypting, the query message containing the encrypted range is transmitted to the mediator 301.

In the same manner as the previous case, the mediator 301 controls the decomposition and the execution of the query message such that an arithmetic relating to this encrypted range is not executed. The sales company 304 extracts the encrypted range within the query message before executing respective query messages and decrypts them.

Although the example in which the information mediation system is applied to the B2B-type mode has been explained in this embodiment, the information mediation system can be applied to a B2C-type mode. To be more specific, a service which integrates electronic detailed statement slips held by financial institutions such as a credit company or a loan company with respect to every individual and provides them to users, or a service which integrates electronic medical reports held by respective medical institutions with respect to every individual and provides them to users and the like are considered.

According to the present invention, the secure multi-database system in which even the administrator cannot easily look into the contents of the data transacted between the client and the external data base can be realized. By allowing the client or the external database system to declare the range to be concealed from the multi-database system, the operation of the multi-database system which takes a trade-off between the security and the manipulation of the database into account becomes possible compared with a prior art which conceals the whole range.

Further, the information mediation system which make it difficult for even an administrator to look into the contents of information transacted between the users and the information providers can be realized. Since the reliability can be easily obtained from the users and the information providers with the use of this system, the business of the information mediation service can be smoothly promoted.

What is claimed is:

1. A multi-database system comprising:
a plurality of database devices for storing distributed data;
a multi-database processing device coupled to the plurality of database devices over a network to receive the distributed data and perform an integration process on the distributed data, the integration process generating integrally processed data; and
a user processing device coupled to the multi-database system over the network, the user processing device receiving said integrally processed data from said multi-database processing device,
wherein a partial data in a first data region included in said distributed data is subjected to a conversion processing based on a preliminarily rule,
wherein the user processing device generates a first query request including first information for indicating an area of the partial data, and sends the first query request to the multi-database processing device,
wherein the multi-database processing device receives the first query request from the user processing device, generates a plurality of second query requests, some of which include the first information, for the plurality of database devices based on the first query request, and sends the plurality of second query requests to the plurality of database devices,
wherein each of the plurality of database devices receives one of the plurality of second query requests, selects data requested by the one of the plurality of second query requests, converts the selected data and adds second information, which indicates that the selected data is converted if the selected data are included in the partial data indicated by the first information included in the one of the plurality of second query requests and sends the selected data to the multi-database processing device,
wherein the multi-database processing device receives a plurality of the selected data from the plurality of database devices, integrates the plurality of the selected data into integrally processed data and sends the integrally processed data to the user processing device, and
wherein the user processing device receives the integrally processed data from the multi-database processing device, checks whether the integrally processed data includes the partial data based on the second information and re-converts the partial data if included.

2. The multi-database system of claim 1,
wherein the user processing device converts data included in the first query request and sends the first query request which includes the converted data to the multi-database processing device,
wherein the multi-database processing device embeds the converted data into some of the plurality of second query requests,
wherein some of the plurality of database devices which receives one of the some of the plurality of second query requests de-converts the converted data and selects data requested by the plurality of second query requests based on the de-converted data.

3. The multi-database system of claim 2, wherein said conversion processing is an encrypting processing and said re-conversion processing is a decrypting processing corresponding to said encrypting processing.

4. The multi-database system of claim 1, further comprising a multi-database definition device coupled to said multi-database processing device through the network, wherein said multi-database definition device transmits definition information which defines said first information to said multi-database processing device.

5. The multi-database system of claim 4, wherein said multi-database definition device and said user device are physically integrally formed.

6. The multi-database system of claim 1, wherein the multi-database processing device generates the plurality of second query requests by performing a syntactic analysis of the first query request, interpreting the first query request using a concealment column, and selecting a path that does not perform an arithmetic operation using the concealment column.

7. The multi-database system of claim 1, wherein the multi-database processing device integrates the plurality of the selected data into integrally processed data by preparing a framework of a first result table, obtaining second result tables from remote databases, determining whether or not an encrypted column is present in the second result tables, adding the encrypted column to the framework of the first result table if the encrypted column is present in the second result tables, and inserting the external results tables including the encrypted column to the first result table.

8. The multi-database system of claim 1, wherein the user processing device re-converts the partial data by obtaining columns of a first result table, determining whether or not one or more the columns of the table are encrypted, retrieving an encrypted column if the table includes one or more encrypted columns, obtaining a record value of the retrieved encrypted column, and decrypting the obtained record value.

9. A multi-database processing device comprising:
a path,
an interface part coupled to said path and to a network;
a storage device coupled to said path, the storage device storing a program for performing an integration processing operation, and
a processing device coupled to said interface part and said storage device through said path, the processing device executing the program to perform the integration processing operation on distributed data received at said interface part from a plurality of database devices,
wherein said storage device receives a plurality of distributed data that are obtained by applying a conversion processing operation to a partial data in a first data region in said distributed data based on a preliminarily determined rule, and said processing device generates integrated data, in accordance with said integration processing operation, by integrating a plurality of said received distributed data based on said program and transmits said integrated data from said interface part to a user device,
wherein the multi-database processing device receives a first query request from the user device coupled to the multi-database processing device, the first query request including first information indicating the first data region associated with the partial data,
wherein the multi-database processing device generates a plurality of second query requests, some of which include the first information and some of which does not include the first information, for the plurality of database devices based on the first query request, and sends the plurality of second query requests to the plurality of database devices,
wherein each of the plurality of database devices receives one of the plurality of second query requests, selects data requested by the one of the plurality of second query requests, converts the selected data and adds second information if the selected data are associated with first data region indicated by the first information and sends the selected data to the multi-database processing device, and
wherein the multi-database processing device receives a plurality of the selected data from the plurality of database devices, integrates the plurality of the selected data into integrally processed data and sends the integrally processed data to the user device.

10. The multi-database processing device of claim 9, wherein said conversion processing operation is an encrypting processing operation.

11. The multi-database processing device of claim 9, wherein said interface part is coupled to a multi-database definition device through the network and receives definition information which defines said first information transmitted from said multi-database definition device.

12. A user processing device in which a plurality of database devices which respectively store data and a multi-database processing device which performs an integration processing on data stored in a plurality of said database devices are connected through a network and said user processing device receives data which is subjected to said integration processing from said multi-database processing device, said user processing device comprising:
means for receiving integrated data which said multi-database processing device integrates, said integrated data generated by integrating a plurality of distributed data wherein among distributed data necessary for an integration processing by said multi-database processing device, a conversion processing is applied to a partial data in a given data region included in said distributed data based on preliminarily determined rule at a plurality of said database devices;
means for applying a re-conversion processing which has a processing content corresponding to said conversion processing to partial integrated data corresponding to the partial data to which said conversion processing is applied among said received integrated data; and
means for outputting integrated data including said partial integrated data to which said re-conversion processing is applied,
wherein the integrated data is received at the user processing device in response to a first query request transmitted to the multi-database processing device by the user processing device, the first query request including first information identifying an area,
wherein a plurality of second query requests is generated at the multi-database processing device in response to the first query request, at least one of which includes area information corresponding to the first information,
wherein the plurality of second query requests are transmitted to the plurality of database devices, wherein each of the plurality of database devices receives one of the plurality of second query requests, selects data requested by the one of the plurality of second query requests, converts the selected data and adds second information, which indicates that the selected data is converted if the selected data corresponds to the area information included in the at least one of the plurality of second query requests,
wherein a plurality of the selected data from the plurality of database devices is received at the multi-database processing device, and
wherein the plurality of the selected data is transformed at the multi-database processing device into integrated data to be transmitted to the user device in response to the first query request.

13. The user processing device of claim 12, wherein said conversion processing is an encrypting processing and said re-conversion processing is a decrypting processing corresponding to said encrypting processing.

* * * * *